United States Patent
Newcombe et al.

(10) Patent No.: US 11,619,814 B1
(45) Date of Patent: Apr. 4, 2023

(54) APPARATUS, SYSTEM, AND METHOD FOR IMPROVING DIGITAL HEAD-MOUNTED DISPLAYS

(71) Applicant: META PLATFORMS TECHNOLOGIES, LLC, Menlo Park, CA (US)

(72) Inventors: Richard Andrew Newcombe, Seattle, WA (US); Renzo De Nardi, Seattle, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 15/997,259

(22) Filed: Jun. 4, 2018

(51) Int. Cl.
| | |
|---|---|
| *G02B 27/01* | (2006.01) |
| *G06T 19/00* | (2011.01) |
| *G06T 7/521* | (2017.01) |
| *G06T 7/70* | (2017.01) |
| *G06F 3/01* | (2006.01) |

(52) U.S. Cl.
CPC ..... *G02B 27/0172* (2013.01); *G02B 27/0179* (2013.01); *G06F 3/013* (2013.01); *G06T 7/521* (2017.01); *G06T 7/70* (2017.01); *G06T 19/006* (2013.01); *G02B 2027/013* (2013.01); *G02B 2027/0138* (2013.01); *G02B 2027/0185* (2013.01); *G02B 2027/0187* (2013.01); *G06T 2207/10028* (2013.01)

(58) Field of Classification Search
CPC .................................................. G02B 27/0172
USPC .......................................................... 345/156
See application file for complete search history.

(56) References Cited

U.S. PATENT DOCUMENTS

| | | | | |
|---|---|---|---|---|
| 9,088,787 B1* | 7/2015 | Smith | ................... | H04N 13/279 |
| 9,983,413 B1* | 5/2018 | Sahlsten | ............ | G02B 26/0816 |
| 10,430,939 B1* | 10/2019 | Levin | ......................... | G06T 7/74 |
| 10,901,225 B1* | 1/2021 | De Nardi | ........... | G02B 27/0093 |
| 2002/0191515 A1* | 12/2002 | Yamanaka | ........... | G11B 7/1275 |
| 2012/0120498 A1* | 5/2012 | Harrison | ............ | G02B 27/0093 |
| | | | | 359/630 |
| 2013/0300911 A1* | 11/2013 | Beckman | ........... | G02B 27/0101 |
| | | | | 348/335 |
| 2015/0260993 A1* | 9/2015 | Bickerstaff | ........ | G02B 27/0172 |
| | | | | 345/8 |
| 2015/0346495 A1* | 12/2015 | Welch | ..................... | G06F 1/163 |
| | | | | 345/8 |
| 2016/0210785 A1* | 7/2016 | Balachandreswaran | ..................... | |
| | | | | G02B 27/0172 |
| 2016/0320623 A1* | 11/2016 | Miyao | ................ | G02B 27/0172 |

(Continued)

OTHER PUBLICATIONS

Microsoft HoloLens; https://www.microsoft.com/en-us/hololens, as accessed Apr. 25, 2018.

(Continued)

*Primary Examiner* — Ariel A Balaoing
(74) *Attorney, Agent, or Firm* — Greenberg Traurig, LLP (57) ABSTRACT

A head-mounted display system may include a wearable frame securable to a user's head. The head-mounted display system may also include a mapping subsystem that maps a local environment of the user when the wearable frame is secured to the user's head. Additionally, the head-mounted display system may include a varifocal display apparatus mounted to the wearable frame and configured to direct computer-generated images toward the user's eyes at a variable focal length. Various other apparatuses, systems, and methods are also disclosed.

20 Claims, 6 Drawing Sheets

(56) References Cited

U.S. PATENT DOCUMENTS

| | | | | |
|---|---|---|---|---|
| 2016/0342835 A1* | 11/2016 | Kaehler | ............. | G02B 27/0172 |
| 2018/0164583 A1* | 6/2018 | Wall | ................... | G02B 27/1086 |
| 2018/0276467 A1* | 9/2018 | Kaehler | ............... | G02B 27/017 |
| 2018/0278843 A1* | 9/2018 | Smith | .............. | H04N 5/232125 |
| 2018/0314066 A1* | 11/2018 | Bell | .................. | G02B 27/0172 |
| 2019/0011612 A1* | 1/2019 | Mastrangelo | ............ | G02B 3/14 |
| 2019/0331919 A1* | 10/2019 | Huo | .................. | G02B 26/0825 |

OTHER PUBLICATIONS

ODG smartglasses; https://www.osterhoutgroup.com/introduction, as accessed Apr. 25, 2018.

Strasdat, Systems and Methods for Display Synchronization in Head-Mounted Display Devices, Co-pending U.S. Appl. No. 16/008,623, filed Jun. 14, 2018.

* cited by examiner

APPARATUS, SYSTEM, AND METHOD FOR IMPROVING DIGITAL HEAD-MOUNTED DISPLAYS

BACKGROUND

Artificial-reality systems, such as virtual-reality systems or augmented-reality systems, typically display computer-generated content to users in order to create immersive experiences. For example, a virtual-reality system may create three-dimensional renderings to simulate an environment or a virtual space. Alternatively, augmented-reality systems may merge computer-generated content with a user's view of a real-world environment to enhance interactions with the real-world environment. These systems may provide users with the ability to navigate and alter digital content that may provide helpful information about real-world objects.

Unfortunately, traditional artificial-reality systems may have limitations that reduce the immersiveness of a user's experience. For example, an augmented-reality headset may have a limited field of view that constrains the user's peripheral vision. Additionally, conventional artificial-reality devices may set a static focal point to direct the user's vision in a particular way. For example, users may be required to look in a certain direction or focus on a certain distance to view the digital images provided by the artificial-reality devices. Thus, these devices may limit the range of a user's vision, which may feel unnatural to the user. Therefore, better methods for displaying computer-generated content are needed to improve the flexibility and range of use of artificial-reality systems.

SUMMARY

As will be described in greater detail below, the instant disclosure describes various apparatuses, systems, and methods for improving digital head-mounted displays by incorporating a varifocal display that adjusts focal distance, such as by tracking eye movement, to suit a user wearing a head-mounted display. In one example, a head-mounted display system may include a wearable frame securable to a user's head. The head-mounted display system may also include a mapping subsystem that maps a local environment of the user when the wearable frame is secured to the user's head. Additionally, the head-mounted display system may include a varifocal display apparatus mounted to the wearable frame and configured to direct computer-generated images toward the user's eyes at a variable focal length.

In some embodiments, the mapping subsystem may include one or more projectors that project structured light into the local environment, an array of depth cameras that captures reflections of the structured light from the local environment, one or more localization devices that determine a location of the head-mounted display system, and/or an array of photographic cameras that captures visible-spectrum light from the local environment. In these embodiments, the array of depth cameras may capture reflections of the structured light to detect a distance between each depth camera and a reflection of the structured light. Additionally, in these embodiments, a localization device may include a localization camera that captures image data for determining a relative position of the head-mounted display system within the local environment and/or a localization sensor that identifies movement of the head-mounted display system within the local environment.

In some examples, the varifocal display apparatus may include an electronic display disposed at an elevated height above the user's eyes, a combiner that reflects the computer-generated images projected from the electronic display toward the user's eyes, and one or more lenses that focus the computer-generated images from the electronic display. In these examples, the varifocal display apparatus may be mounted to the wearable frame such that the combiner is visible to the user when the wearable frame is secured to the user's head.

In one example, the head-mounted display system may further include an eye-tracking subsystem mounted to the wearable frame, wherein the eye-tracking subsystem tracks the user's eyes when the head-mounted display system is secured to the user's head. In this example, the varifocal display apparatus may adjust the focal length based on eye movement detected by the eye-tracking subsystem. Additionally, the head-mounted display system may further include a computing subsystem communicatively coupled to the mapping subsystem, the varifocal display apparatus, and the eye-tracking subsystem. In this example, the computing subsystem may construct the computer-generated images directed toward the user's eyes based on a map of the local environment constructed by the mapping subsystem and/or the eye movement detected by the eye-tracking subsystem.

According to various embodiments, a corresponding varifocal display apparatus may include an electronic display disposed at an elevated height above a user's eyes. The varifocal display apparatus may also include a combiner that reflects computer-generated images projected from the electronic display toward the user's eyes. Additionally, the varifocal display apparatus may include one or more lenses that focus the computer-generated images from the electronic display based on eye movement of the user's eyes.

In some examples, the electronic display may emit visible-spectrum light to project the computer-generated images toward the combiner. In these examples, the combiner may include a curved surface that reflects the visible-spectrum light emitted by the electronic display to direct the computer-generated images toward the user's eyes.

In one embodiment, the combiner may include a transparent material that permits visible-spectrum light from the local environment to reach the user's eyes.

In one example, a lens may be disposed between the electronic display and the combiner to control a variable focal length of the varifocal display apparatus. In this example, the varifocal display apparatus may further include an eye-tracking subsystem that tracks the user's eyes to detect the eye movement of the user's eyes. Furthermore, in this example, the varifocal display apparatus may include a display actuator that moves the lens to change the focal length based on the detected eye movement of the user's eyes.

In addition to the various systems and apparatuses described herein, the instant disclosure presents exemplary methods for improving digital head-mounted displays. For example, a corresponding method may include dimensioning a wearable frame of a head-mounted display system. The method may also include coupling a mapping subsystem to the wearable frame, wherein the mapping subsystem is configured to map a local environment of a user when the wearable frame is secured to the user's head. Additionally, the method may include mounting a varifocal display apparatus to the wearable frame, wherein the varifocal display apparatus is configured to direct computer-generated images toward the user's eyes at a variable focal length.

In some embodiments, the method may further include mounting an eye-tracking subsystem to the wearable frame, wherein the eye-tracking subsystem tracks the user's eyes when the head-mounted display system is secured to the user's head.

In some examples, the above method may further include communicatively coupling a computing subsystem to the mapping subsystem, the varifocal display apparatus, and the eye-tracking subsystem.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes and illustrates various apparatuses, systems, and methods for improving digital head-mounted displays. As will be explained in greater detail below, embodiments of the instant disclosure may, by incorporating a varifocal subsystem into a head-mounted display system, provide a wider field of view with variable focal length. For example, a mapping subsystem may map a user's local environment to detect objects within the environment. In addition, a computing subsystem may generate the images to be displayed to the user based on the map of the local environment. A varifocal display apparatus may then adjust the focal length of the displayed image. Furthermore, an eye-tracking subsystem may track the user's eye movement to determine how to accurately adjust the system's focal length.

Figure 1:
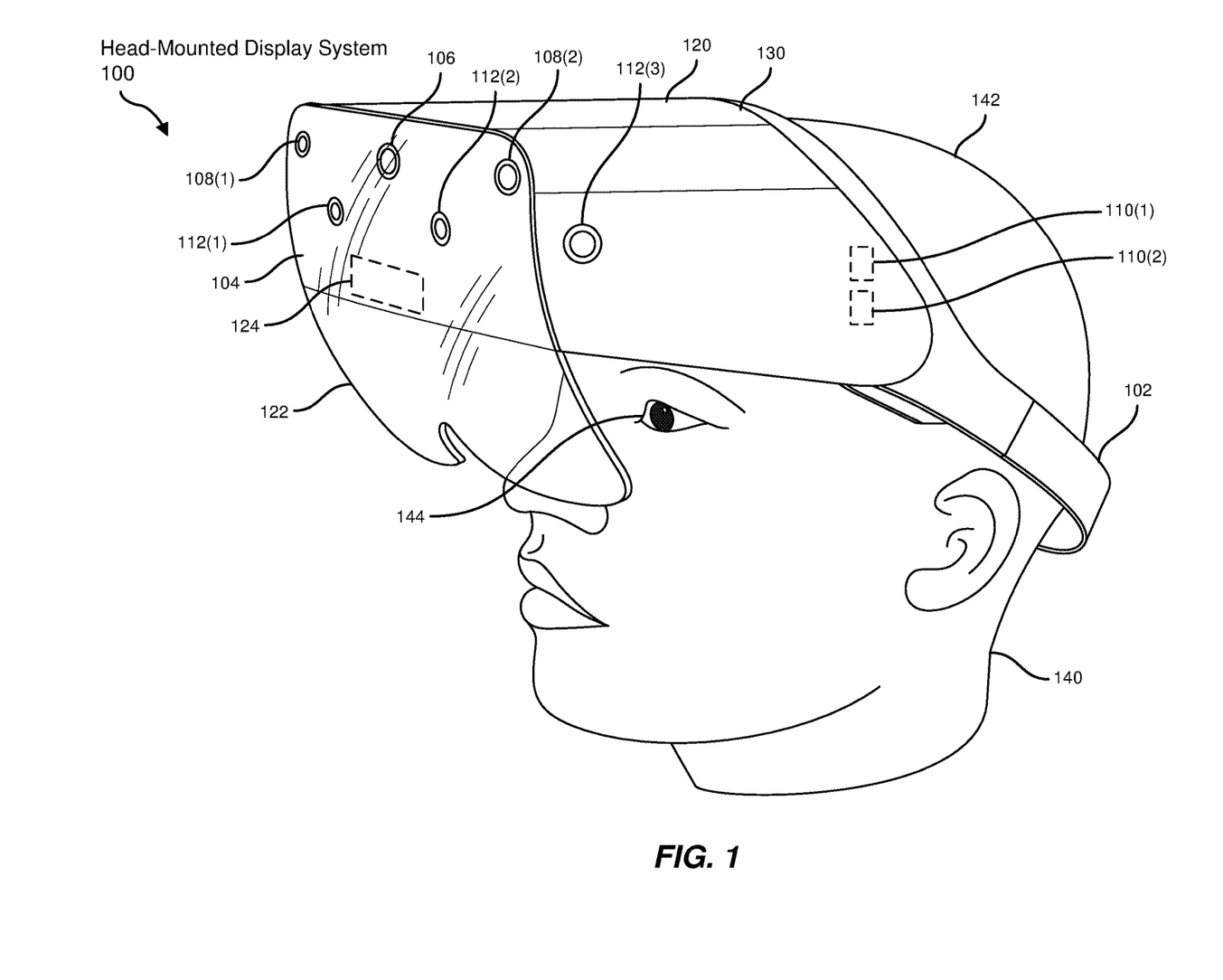
FIG. 1 is a perspective view of an exemplary head-mounted display system worn by a user according to some embodiments.
Figure 2:
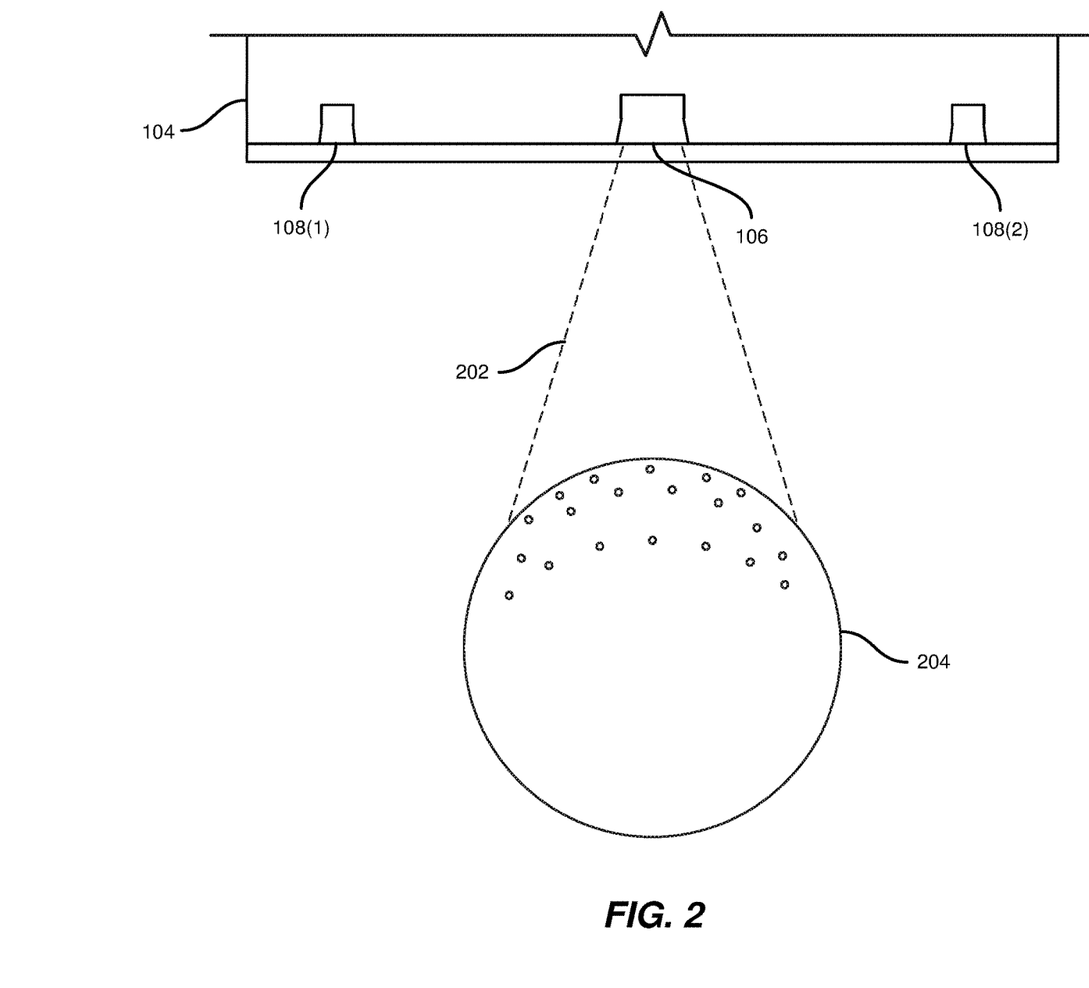
FIG. 2 is a top view of an exemplary mapping subsystem mapping an exemplary local environment according to some embodiments.
Figure 3:
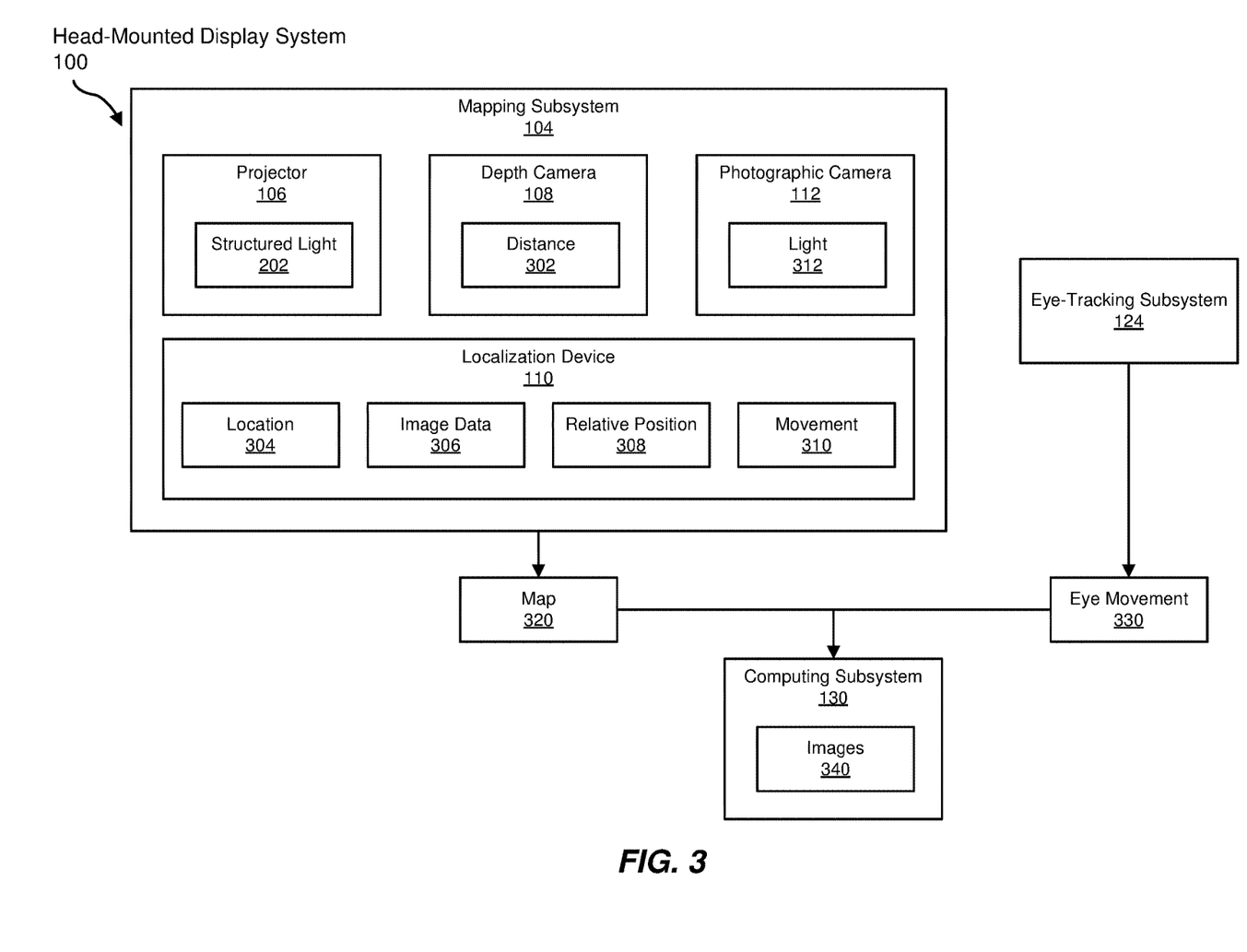
FIG. 3 is a block diagram of an exemplary head-mounted display system generating images according to some embodiments.

The following will provide, with reference to FIGS. 1-3, detailed descriptions of a head-mounted display system capable of generating and display computer-generated images, such as those used in augmented reality systems. In addition, the discussion associated with FIGS. 4-5 will provide examples of varifocal display apparatuses capable of adjusting a focal length of the computer-generated images. Furthermore, detailed descriptions of methods for improving digital head-mounted displays will be provided in connection with FIG. 6.

FIG. 1 illustrates a perspective view of an exemplary head-mounted display system 100 worn by a user 140. As shown in FIG. 1, head-mounted display system 100 may include a wearable frame 102 securable to a user's head 142. Head-mounted display system 100 may also include a mapping subsystem 104 that maps a local environment of user 140 when wearable frame 102 is secured to the user's head 142. Additionally, head-mounted display system 100 may include a varifocal display apparatus 120 mounted to wearable frame 102 and configured to direct computer-generated images toward the user's eyes 144 at a variable focal length. The term "varifocal display" may, in some examples, refer to a digital display, screen, or subsystem that is capable of emulating images at different focal lengths from a viewer's perspective (by, e.g., adjusting the position or orientation of a lens or display, as described in greater detail below). In addition, the term "focal length" may, in some examples, refer to a distance between a lens and a focus related to the lens. For example, a focal length may include a distance between the user's eyes 144 and the computer-generated images, a distance between the images and a display of the images, a distance between a camera lens and the local environment, and/or any other suitable distance that may be adjusted to alter the perceived focus of the computer-generated images.

In some embodiments, mapping subsystem 104 may include a projector 106, shown in FIG. 1, that projects structured light into the local environment. Mapping subsystem 104 may also include an array of depth cameras, such as depth cameras 108(1) and 108(2), that captures reflections of the structured light from the local environment. Furthermore, mapping subsystem 104 of FIG. 1 may include localization devices 110(1) and 110(2) that determine a location of head-mounted display system 100. Additionally, mapping subsystem 104 may include an array of photographic cameras, such as photographic cameras 112(1), 112(2), and 112(3) of FIG. 1, that captures visible-spectrum light from the local environment. In one embodiment, localization devices 110(1) and/or 110(2) and/or photographic cameras 112(1)-(3) may be arranged to face forward and/or to the sides of user 140 to capture a wider field of view.

In some examples, localization devices 110(1) and/or 110(2) may include a localization camera that captures image data for determining a relative position of head-mounted display system 100 within the local environment and/or a localization sensor that identifies movement of head-mounted display system 100 within the local environment. For example, localization device 110(1) may represent a set of localization cameras that utilizes a simultaneous localization and mapping (SLAM) system to detect the location of head-mounted display system 100 relative to other objects and entities within the local environment. As another example, localization device 110(2) may include an inertial measurement unit (IMU) (e.g., gyroscope, accelerometer, etc.) that detects the movement or orientation of head-mounted display system 100 to determine a change in a location of user 140.

In the above examples, mapping subsystem 104 may construct a digital map of the local environment based on data collected from the various devices of mapping subsystem 104. For example, mapping subsystem 104 may detect changes in the position of the user's head 142 and update a constructed map accordingly. Although illustrated in FIG. 1 with a limited number of cameras, sensors, and/or devices, head-mounted display system 100 may include a multitude of additional similar devices that improve the accuracy of mapping the local environment while user 140 is wearing head-mounted display system 100.

In one embodiment, varifocal display apparatus 120 may include a combiner 122 that reflects the computer-generated images toward the user's eyes 144. The term "combiner" may, in some examples, refer to a device or system that combines multiple sources of image data to present a unified view, such as by mixing digital and real-world images to create an augmented view.

In the above embodiment, varifocal display apparatus 120 may be mounted to wearable frame 102 such that combiner 122 is visible to user 140 when wearable frame 102 is secured to the user's head 142. Additionally, head-mounted display system 100 may include an eye-tracking subsystem 124, mounted to wearable frame 102, that tracks the user's eyes 144 when head-mounted display system 100 is secured to the user's head 142 to detect movement of the user's eyes 144. In this embodiment, eye-tracking subsystem 124 may include one or more sensors and/or cameras capable of tracking changes in the user's eyes 144 that may indicate a change in a direction or a focus of vision. For example, eye-tracking subsystem 124 may include a light source (such as an infrared (IR) light source) configured to project (either directly or via combiner 122) IR light onto the user's eyes 144. One or more IR sensors or cameras included within eye-tracking subsystem 124 may then receive (either directly or via combiner 122) IR light reflected off of the user's eyes 144. A computing subsystem (such as computing subsystem 130 described below) may then analyze sensor data generated by the IR sensors or cameras to determine where user 140 is gazing. In this example, eye-tracking subsystem 124 may independently track each eye of user 140 and/or track both eyes to determine the direction of gaze and/or interpupillary distance indicating a focal distance of the gaze.

In one example, head-mounted display system 100 may further include a computing subsystem 130 communicatively coupled to mapping subsystem 104, varifocal display apparatus 120, and eye-tracking subsystem 124. Computing subsystem 130 generally represents any type or form of computing device or system capable of reading computer-executable instructions. For example, computing subsystem 130 may represent one or more devices or portions of devices within head-mounted display system 100 that are capable of sending, receiving, storing, and/or analyzing data generated by one or more of the various components of head-mounted display system 100. Alternatively, computing subsystem 130 may represent one or more separate or external devices in communication with head-mounted display system 100, such as by wired or wireless means.

FIG. 2 illustrates a top view of mapping subsystem 104 mapping an exemplary local environment 204. As shown in FIG. 2, mapping subsystem 104 may include projector 106 that projects structured light 202 into local environment 204, which may include an object or entity such as a spherical structure. In this example, depth cameras 108(1) and 108(2) may capture reflections of structured light 202 from local environment 204. Additionally, depth cameras 108(1) and 108(2) may capture the reflections of structured light 202 to detect a distance between depth cameras 108(1) and 108(2) and the reflection of structured light 202. For example, depth cameras 108(1) and 108(2) may capture different patterns produced by the reflection of structured light 202 from different positions and deduce, based on the captured reflections, that local environment 204 includes the spherical structure.

In some embodiments, local environment 204 may represent a closed environment, such as an indoor environment without strong infrared (IR) interference from sunlight, and/or any other suitable environment. In these embodiments, depth cameras 108(1) and 108(2) may represent digital IR cameras that capture reflections of structured light 202 to determine the distance between head-mounted display system 100 and objects and/or features within local environment 204. Additionally, as in the example of FIG. 1, photographic cameras 112(1)-(3) may represent digital photographic cameras that capture color information from local environment 204. The combination of photographic cameras and depth cameras may capture the colors and distances of objects and/or features from head-mounted display system 100 to reconstruct the locations and appearances of the objects and/or features within local environment 204.

FIG. 3 illustrates a block diagram of head-mounted display system 100 capable of generating images 340. As shown in FIG. 3, mapping subsystem 104 may include projector 106 that projects structured light 202 and a depth camera 108 that captures reflections of structured light 202 to detect a distance 302 between depth camera 108 and the reflection of structured light 202 from the local environment. Mapping subsystem 104 may also include a localization device 110 that determines a location 304 of head-mounted display system 100. In this example, localization device 110 may capture image data 306 for determining a relative position 308 of head-mounted display system 100 within the local environment and may identify movement 310 of head-mounted display system 100. Mapping subsystem 104 may further include a photographic camera 112 that captures visible-spectrum light 312 from the local environment. Mapping subsystem 104 may then aggregate the data from the various devices to construct a map 320 of the local environment. Although not illustrated in FIG. 3, mapping subsystem 104 may utilize additional data to improve the construction of map 320, such as correlating time stamps with captured data to account for potential movement of the user while wearing head-mounted display system 100.

In one example, head-mounted display system 100 may further include eye-tracking subsystem 124 that tracks the user's eyes to detect eye movement 330 of the user's eyes. In the example of FIG. 3, computing subsystem 130 may construct computer-generated images 340 based on map 320 of the local environment constructed by mapping subsystem 104 and eye movement 330 detected by eye-tracking subsystem 124. In this example, augmented-reality content may be superimposed on map 320 for specific objects and/or features based on detected eye movement 330. Additionally, computer-generated images 340 may provide additional context or information about the local environment and display the additional information to user 140 when the user's eyes focus on an object or feature of the local environment. For example, based on a known object within map 320, computer-generated images 340 may display a menu to view details about the object when eye movement 330 indicates that user 140 is looking at the object.

Figure 4:
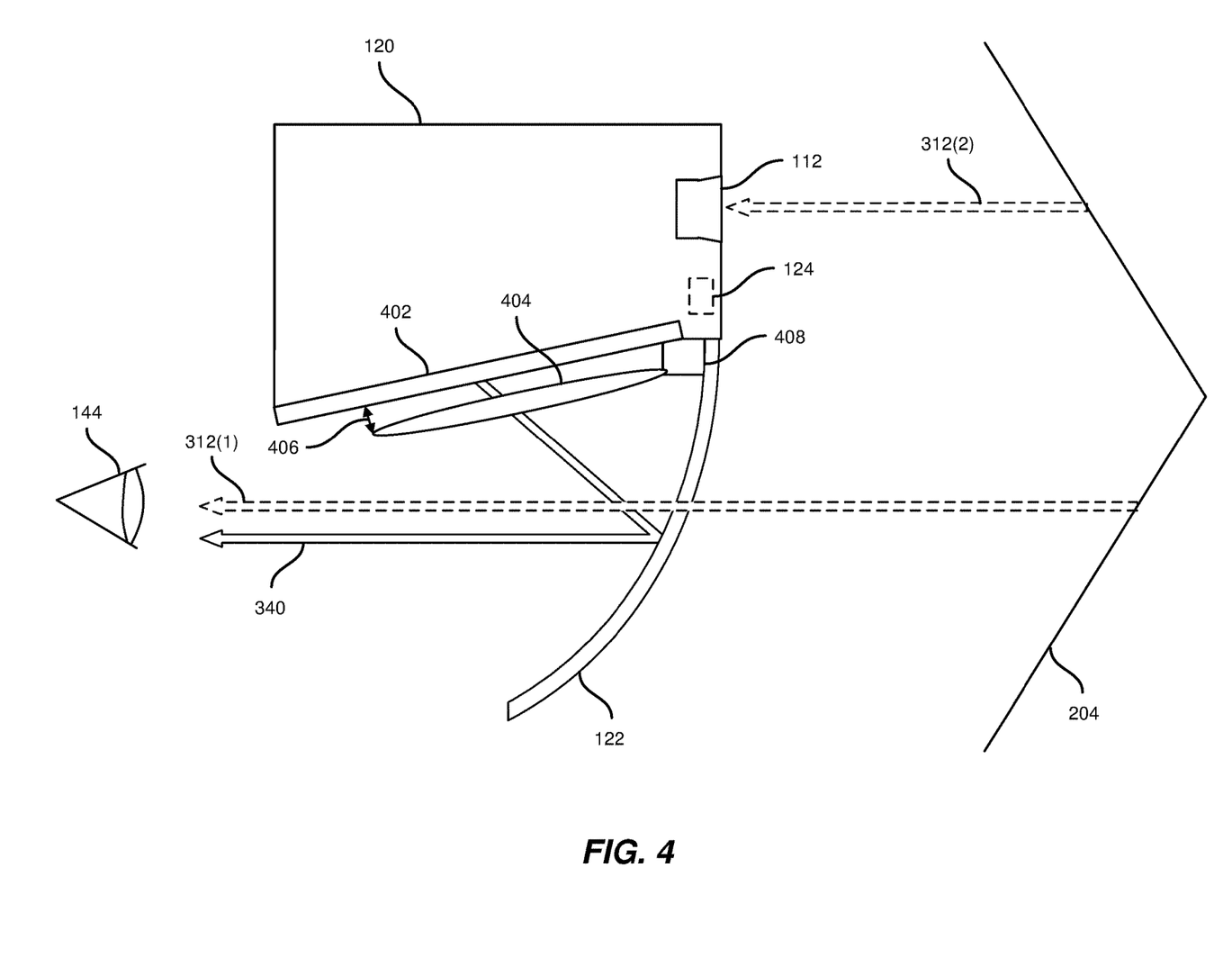
FIG. 4 is a side view of an exemplary varifocal display apparatus according to some embodiments.

FIG. 4 illustrates a side view of varifocal display apparatus 120 of head-mounted display system 100. As shown in FIG. 4, varifocal display apparatus 120 may include an electronic display 402 disposed at an elevated height above a user's eye 144. In this example, combiner 122 may reflect computer-generated images 340 projected from electronic display 402 toward the user's eye 144. Additionally, a lens 404 may focus computer-generated images 340 from electronic display 402. Lens 404 may represent any type or form of transparent material that focuses light passing through lens 404. In the example of FIG. 4, varifocal display apparatus 120 may represent a periscope-style display that captures visible-spectrum light 312(2) from local environment 204 using photographic camera 112 and subsequently projects images 340 at a lower height based on captured visible-spectrum light 312(2).

In some embodiments, electronic display 402 may emit visible-spectrum light to project computer-generated images 340 toward combiner 122. In these embodiments, combiner 122 may include a curved surface that reflects the visible-spectrum light emitted by electronic display 402 to direct computer-generated images 340 toward the user's eye 144. For example, the interior surface of combiner 122 may include a reflective material. In another example, combiner 122 may include electronic display capabilities and receive computer-generated images 340 to display to the user's eye 144.

Additionally, in one embodiment, combiner 122 may include a transparent material that permits visible-spectrum light 312(1) from local environment 204 to reach the user's eye 144. For example, combiner 122 may include glass or transparent plastic that permits at least part of visible-spectrum light 312(1) to travel through combiner 122. Additionally or alternatively, combiner 122 may be tinted such that computer-generated images 340 may be clearly superimposed at a brighter contrast over visible-spectrum light 312(1) that is visible to the user's eye 144.

In some examples, such as the example of FIG. 4, lens 404 may be disposed between electronic display 402 and combiner 122 to control a variable focal length 406 of varifocal display apparatus 120. In these examples, lens 404 may focus computer-generated images 340 to appear at a particular distance from the user's eye 144. Additionally or alternatively, lens 404 may represent a part of combiner 122, such as the interior surface of combiner 122, may be disposed between the user's eye 144 and combiner 122, and/or may be disposed at photographic camera 112 to focus incoming visible-spectrum light 312(2). Although not illustrated in FIG. 4, lens 404 may include multiple lenses at one or more of the positions listed above.

In some embodiments, varifocal display apparatus 120 may include eye-tracking subsystem 124 that tracks the user's eye 144 to detect an eye movement of the user's eye 144. In these embodiments, a display actuator 408 may be dimensioned to move lens 404 to change focal length 406 based on the detected eye movement of the user's eye 144.

Figure 5:
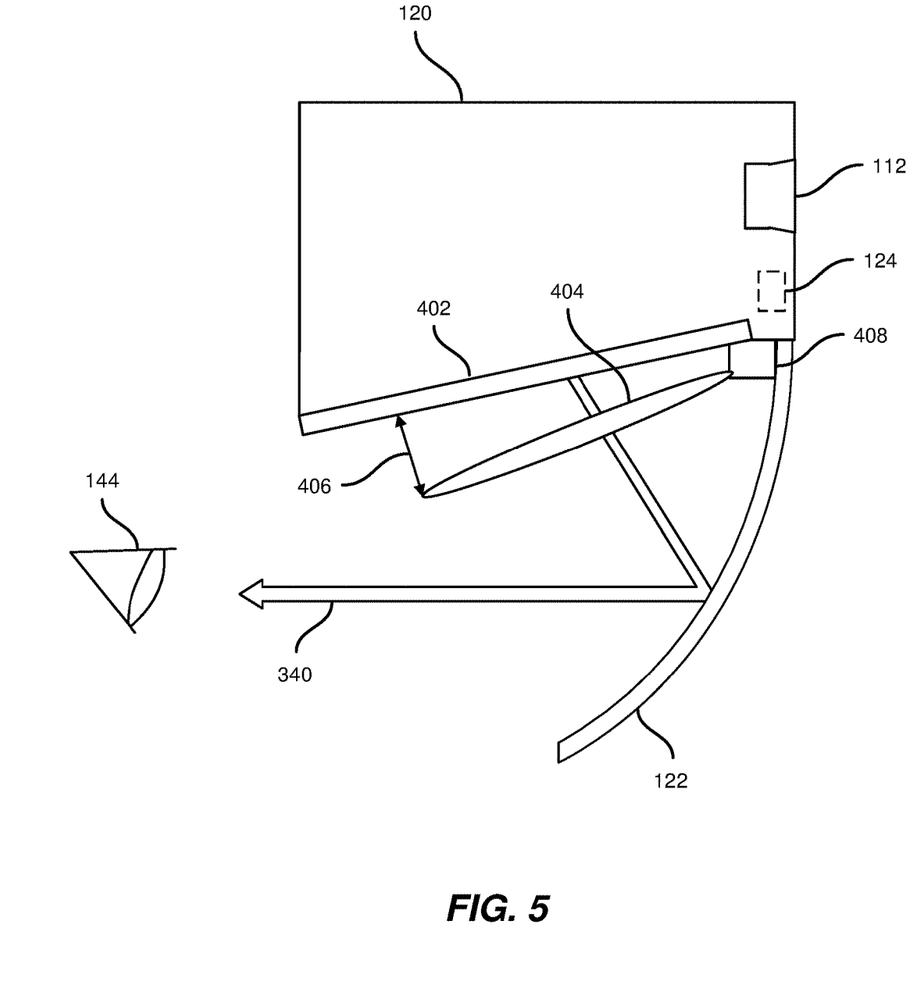
FIG. 5 is a side view of an exemplary varifocal display apparatus incorporating eye-tracking according to some embodiments.

FIG. 5 illustrates a side view of varifocal display apparatus 120 incorporating eye-tracking of the user's eye 144. Similar to the example of FIG. 4, varifocal display apparatus 120 of FIG. 5 may adjust focal length 406 based on eye movement detected by eye-tracking subsystem 124. In the example of FIG. 5, eye-tracking subsystem 124 may determine that the user's eye 144 is in a different position from the example of FIG. 4, thereby detecting the eye movement, such as eye movement 330 of FIG. 3, of the user's eye 144.

Subsequently, display actuator 408 may move lens 404 to change focal length 406 based on the detected eye movement. For example, display actuator 408 may tilt lens 404, adjust a space between lens 404 and electronic display 402, move lens 404 to focus computer-generated images 340 at a different portion of lens 404, and/or make any other adjustment or combination of adjustments to focus computer-generated images 340 from electronic display 402 based on eye movement 330 of the user's eye 144. In these examples, combiner 122 may then reflect computer-generated images 340 at an adjusted focal distance where the user's eye 144 may be viewing.

Figure 6:
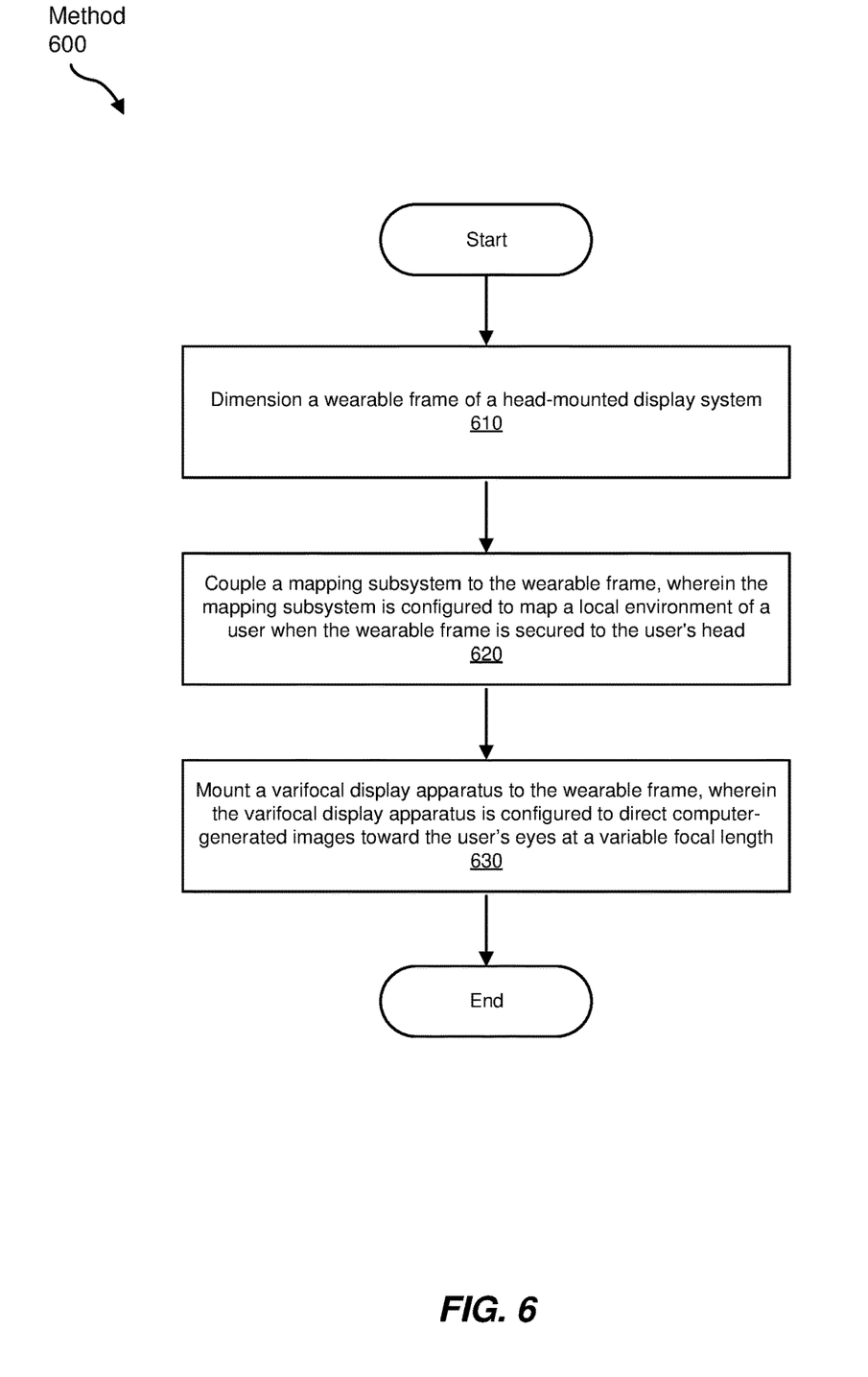
FIG. 6 is a flow diagram of an exemplary method for improving digital head-mounted displays.

FIG. 6 shows a flow diagram of an exemplary computer-implemented method 600 for improving digital head-mounted displays, such as head-mounted display system 100 of FIG. 1. The steps shown in FIG. 6 may be performed by any individual and/or by any suitable type or form of manual and/or automated apparatus. In one example, each of the steps shown in FIG. 6 may represent an algorithm whose structure includes and/or is represented by multiple substeps, examples of which will be provided in greater detail below.

As illustrated in FIG. 6, at step 610, a wearable frame of a head-mounted display system may be dimensioned. For example, as illustrated in FIG. 1, wearable frame 102 of head-mounted display system 100 may be dimensioned to fit a user, such as user 140.

The systems described herein may perform step 610 of FIG. 6 in a variety of ways. In one example, a variety of manufacturing or assembly steps or processes may be used to dimension wearable frame 102. For example, one or more strap assemblies may be coupled to wearable frame 102 to enable the same to be mounted to a user's head. In some embodiments, wearable frame 102 may be configured to be adjustably fitted to the user's head 142, such as by an adjustable strap. Alternatively, wearable frame 102 may include one or more adjustable materials, such as an elastic material, that automatically adjusts to fit each user. Additionally or alternatively, wearable frame 102 may be dimensioned to adjustably mount varifocal display apparatus 120 of FIG. 1 to user 140 such that computer-generated images 340 may be visible to user 140.

Returning to FIG. 6, at step 620, one or more of the systems described herein may couple, to the wearable frame, a mapping subsystem that is configured to map a local environment of a user when the wearable frame is secured to the user's head. For example, as illustrated in FIG. 1, mapping subsystem 104 may be coupled to wearable frame 102 and configured to map local environment 204 of FIG. 2 when wearable frame 102 is secured to the user's head 142.

The systems described herein may perform step 620 of FIG. 6 in a variety of ways. In some examples, mapping subsystem 104 may be mounted to wearable frame 102 as part of varifocal display apparatus 120. Additionally or alternatively, mapping subsystem 104 may include a separate subsystem and/or device and communicatively send mapping data to head-mounted display system 100. For example, mapping subsystem 104 may include cameras and sensors mounted to wearable frame 102 and a separate device, such as a smart watch, that captures a movement of user 140. In another example, mapping subsystem 104 may include devices positioned around the local environment to capture user 140 in the local environment. In these examples, mapping subsystem 104 may then map the local environment and send the map of the local environment to head-mounted display apparatus for use in generating images 340 to user 140.

Returning to FIG. 6, at step 630, one or more of the systems described herein may mount, to the wearable frame, a varifocal display apparatus that is configured to direct computer-generated images toward the user's eyes at a variable focal length. For example, as illustrated in FIGS. 2 and 4, varifocal display apparatus 120 may be mounted to wearable frame 102 and configured to direct computer-generated images 340 toward the user's eyes 144 at variable focal length 406.

The systems described herein may perform step 630 of FIG. 6 in a variety of ways. In one embodiment, varifocal display apparatus may be mounted to wearable frame 102 such that combiner 122 is visible to user 140 and electronic display 402 of FIG. 4 is above the user's eyes 144. Additionally, electronic display 402 may be configured to direct computer-generated images 340 toward combiner 122 at variable focal length 406, and combiner 122 may reflect computer-generated images 340 to the user's eyes 144.

In some examples, method 600 may further include a step in which an eye-tracking subsystem is mounted to the wearable frame. In these examples, the eye-tracking subsystem may track the user's eyes when the head-mounted display system is secured to the user's head. For example, as illustrated in FIG. 1, eye-tracking subsystem 124 may be mounted to wearable frame 102 and may track the user's eyes 144 when head-mounted display system 100 is secured to the user's head 142.

In some embodiments, method 600 may further include a step in which a computing subsystem is communicatively coupled to the mapping subsystem, the varifocal display apparatus, and the eye-tracking subsystem. For example, as illustrated in FIGS. 1 and 3, computing subsystem 130 may be communicatively coupled to mapping subsystem 104, varifocal display apparatus 120, and eye-tracking subsystem 124. In these embodiments, computing subsystem 130 may generate images 340 based on a map of the local environment constructed by mapping subsystem 104 and a focus of the user's eyes 144 determined by eye-tracking subsystem 124. Computing subsystem 130 may then instruct varifocal display apparatus 120 to display computer-generated images 340 to user 140.

As discussed throughout the instant disclosure, the disclosed methods, systems, and apparatuses may provide one or more advantages over traditional head-mounted displays. For example, the periscope-style varifocal display apparatus disclosed herein may display a wider field of view than traditional displays by projecting computer-generated images to a combiner in front of a user's eyes. By mounting cameras and sensors above the user's eyes, the methods, systems, and apparatuses described herein may capture more peripheral image data in a local environment. Additionally, by mapping the local environment with a mapping subsystem, the methods, systems, and apparatuses described herein may identify and digitize objects and features in the local environment to enhance artificial-reality content. Furthermore, by tracking the user's eyes with an eye-tracking subsystem, the disclosed methods, systems, and apparatuses may automatically adjust a focal length of the computer-generated images by adjusting one or more lenses of the varifocal display apparatus to match the focus of the user's eyes. Thus, the methods, systems, and apparatuses described herein may improve the range of visual information that can be displayed to users and the ease of use of a head-mounted display.

Embodiments of the instant disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A head-mounted display system comprising:
a wearable frame securable to a user's head;
an eye-tracking subsystem, mounted to the wearable frame, that tracks the user's eyes when the head-mounted display system is secured to the user's head; and
a varifocal display apparatus mounted to the wearable frame, wherein the varifocal display apparatus comprises:
a visible-spectrum camera that captures visible-spectrum light from a local environment of the user at a location above the user's eyes;

an electronic display that is disposed at an elevated height above the user's eyes and displays computer-generated images that are based in part on the captured visible-spectrum light;

a combiner positioned in front of the user's eyes and having a curved surface facing the user's eyes;

at least one lens positioned between the electronic display and the combiner, wherein the electronic display and the at least one lens are positioned to permit passage of visible-spectrum light from the local environment through the combiner, while the curved surface of the combiner reflects the computer-generated images received from the electronic display through the at least one lens toward the user's eyes; and an actuator that tilts, in response to eye movement detected by the eye-tracking subsystem, the at least one lens to adjust a tilt angle between the at least one lens and the electronic display to adjust a focal length of the computer-generated images and thus variably focus the computer-generated images from the electronic display at the user's eyes.

2. The head-mounted display system of claim 1, further comprising a mapping subsystem that comprises at least one of:
at least one projector that projects structured light into the local environment;
an array of depth cameras that captures reflections of the structured light from the local environment;
at least one localization device that determines a location of the head-mounted display system; and
an array of photographic cameras that captures visible-spectrum light from the local environment.

3. The head-mounted display system of claim 2, wherein the array of depth cameras captures reflections of the structured light to detect a distance between each depth camera and a reflection of the structured light.

4. The head-mounted display system of claim 2, wherein the localization device comprises at least one of:
a localization camera that captures image data for determining a relative position of the head-mounted display system within the local environment; or
a localization sensor that identifies movement of the head-mounted display system within the local environment.

5. The head-mounted display system of claim 2, further comprising a computing subsystem communicatively coupled to:
the mapping subsystem;
the varifocal display apparatus; and
the eye-tracking subsystem.

6. The head-mounted display system of claim 5, wherein the computing subsystem constructs the computer-generated images directed toward the user's eyes based on at least one of:
a map of the local environment constructed by the mapping subsystem; or
the eye movement detected by the eye-tracking subsystem.

7. A varifocal display apparatus comprising:
an electronic display disposed at an elevated height above a user's eyes that emits visible-spectrum light to project computer-generated images based in part on visible-spectrum light captured by a visible-spectrum camera from a local environment of the user at a location above the user's eyes;

an eye-tracking subsystem that tracks the user's eyes when the varifocal display apparatus is secured to the user's head;
a combiner positioned in front of the user's eyes and having a curved surface facing the user's eyes;
at least one lens positioned between the electronic display and the combiner, wherein the electronic display and the at least one lens are positioned to permit passage of visible-spectrum light from the local environment through the combiner while the curved surface of the combiner reflects the computer-generated images received from the electronic display through the at least one lens to the user's eyes; and
an actuator that tilts, in response to eye movement detected by the eye-tracking subsystem, the at least one lens to adjust a tilt angle between the at least one lens and the electronic display to adjust a focal length of the computer-generated images and thus variably focus the computer-generated images projected from the electronic display at the user's eyes.

8. The varifocal display apparatus of claim 7, wherein the combiner comprises a reflective material that reflects the visible-spectrum light emitted by the electronic display to direct the computer-generated images toward the user's eyes.

9. The varifocal display apparatus of claim 7, further comprising a mapping subsystem that generates a map of a local environment of the user.

10. The varifocal display apparatus of claim 9, wherein the actuator also variably focuses the computer-generated images projected from the electronic display based on the map of the local environment.

11. The varifocal display apparatus of claim 7, wherein the actuator adjusts a distance between the at least one lens and the electronic display by at least translating the at least one lens.

12. A method comprising:
mounting an eye-tracking subsystem to a wearable frame of a head-mounted display system, wherein the eye-tracking subsystem is configured to track a user's eyes when the head-mounted display system is secured to the user's head;
mounting a varifocal display apparatus to the wearable frame, wherein the varifocal display apparatus comprises:
a visible-spectrum camera that captures visible-spectrum light from a local environment of the user at a location above the user's eyes;
an electronic display that is disposed at an elevated height above the user's eyes and displays computer-generated images that are based in part on the captured visible-spectrum light;
a combiner positioned in front of the user's eyes and having a curved surface facing the user's eyes, wherein the curved surface;
at least one lens positioned between the electronic display and the combiner, wherein the electronic display and the at least one lens are positioned to permit passage of visible-spectrum light from the local environment through the combiner while the curved surface of the combiner reflects the computer-generated images received from the electronic display through the at least one lens to the user's eyes; and
an actuator that tilts, in response to eye movement detected by the eye-tracking subsystem, the at least one lens to adjust a tilt angle between the at least one lens and the electronic display to adjust a focal length of the computer-generated images and thus variably focus the computer-generated images from the electronic display at the user's eyes.

13. The method of claim 12, further comprising communicatively coupling a computing subsystem to:
a mapping subsystem;
the varifocal display apparatus; and
the eye-tracking subsystem.

14. The head-mounted display system of claim 1, wherein adjusting the tilt angle between the at least one lens and the electronic display changes a region of the at least one lens onto which the computer-generated images from the electronic display are focused.

15. The varifocal display apparatus of claim 7, wherein adjusting the tilt angle between the at least one lens and the electronic display changes a region of the at least one lens onto which the computer-generated images from the electronic display are focused.

16. The varifocal display apparatus of claim 5, wherein the computing subsystem is configured to reconstruct a location and an appearance of at least one object within the local environment based at least in part on data captured by the photographic cameras and the depth cameras.

17. The varifocal display apparatus of claim 7, wherein the varifocal display apparatus is coupled to a computing subsystem configured to reconstruct a location and an appearance of at least one object within the local environment based at least in part on data captured by at least one photographic camera and at least one depth camera.

18. The head-mounted display system of claim 3, wherein:
the array of depth cameras capture different patterns produced by reflections of the structured light from different positions; and
a computing subsystem is configured to deduce, based on the captured patterns, that the local environment includes at least one object.

19. The varifocal display apparatus of claim 9, wherein:
the mapping subsystem further comprises an array of depth cameras capable of capturing different patterns produced by reflections of structured light from different positions; and
a computing subsystem is configured to deduce, based on the captured patterns, that the local environment includes at least one object.

20. The method of claim 13, wherein the computing subsystem is configured to reconstruct a location and an appearance of at least one object within the local environment based at least in part on data captured by at least one photographic camera and at least one depth camera.

* * * * *